Sept. 17, 1929.  F. H. MONTREUIL  1,728,434
THRUST BEARING
Filed Jan. 25, 1927

Inventor
Frank H. Montreuil.
By
Attorney.

Patented Sept. 17, 1929

1,728,434

UNITED STATES PATENT OFFICE

FRANK H. MONTREUIL, DECEASED, LATE OF CHICAGO, ILLINOIS, BY STRAUS TRUST COMPANY, EXECUTOR, OF CHICAGO, ILLINOIS, ASSIGNOR, BY MESNE ASSIGNMENTS, TO STRAUS NATIONAL BANK AND TRUST COMPANY OF CHICAGO, TRUSTEE, A CORPORATION

THRUST BEARING

Application filed January 25, 1927. Serial No. 163,546.

In some classes of machinery thrust bearings are required which are submerged in a hot fluid and which are, therefore, impossible of lubrication in the ordinary way. For example, such bearings are required in devices known as condensation pumps and which employ a vertical shaft supported at the bottom in a thrust bearing, and in which the shaft revolves while the said bearing is submerged in hot water. Under these conditions, it is manifest that oil or grease cannot be maintained upon the bearing.

The object of the invention is to provide a suitable thrust bearing adapted to be employed in the presence of hot water or other fluid and so constructed that oil and grease or other lubricant is eliminated, and in lieu thereof, the bearing comprises a socket in which the lower end of the shaft is stepped and centered and preferably provided with roller or ball bearings, the said thrust bearing as a whole being filled with mercury to submerge the operative parts, the purpose of said mercury being to prevent any foreign matter, fluid or solid, from finding its way to the operative parts of the bearing, it being understood that the bearing parts which come in contact with the mercury are formed of iron or steel or other material with which the mercury has no direct affinity.

The invention also consists of improvements hereinafter described whereby the above objects and results are attained, said improvements comprising certain organization and combination of parts which are fully described hereinafter and more particularly defined in the claims.

Figure 1:
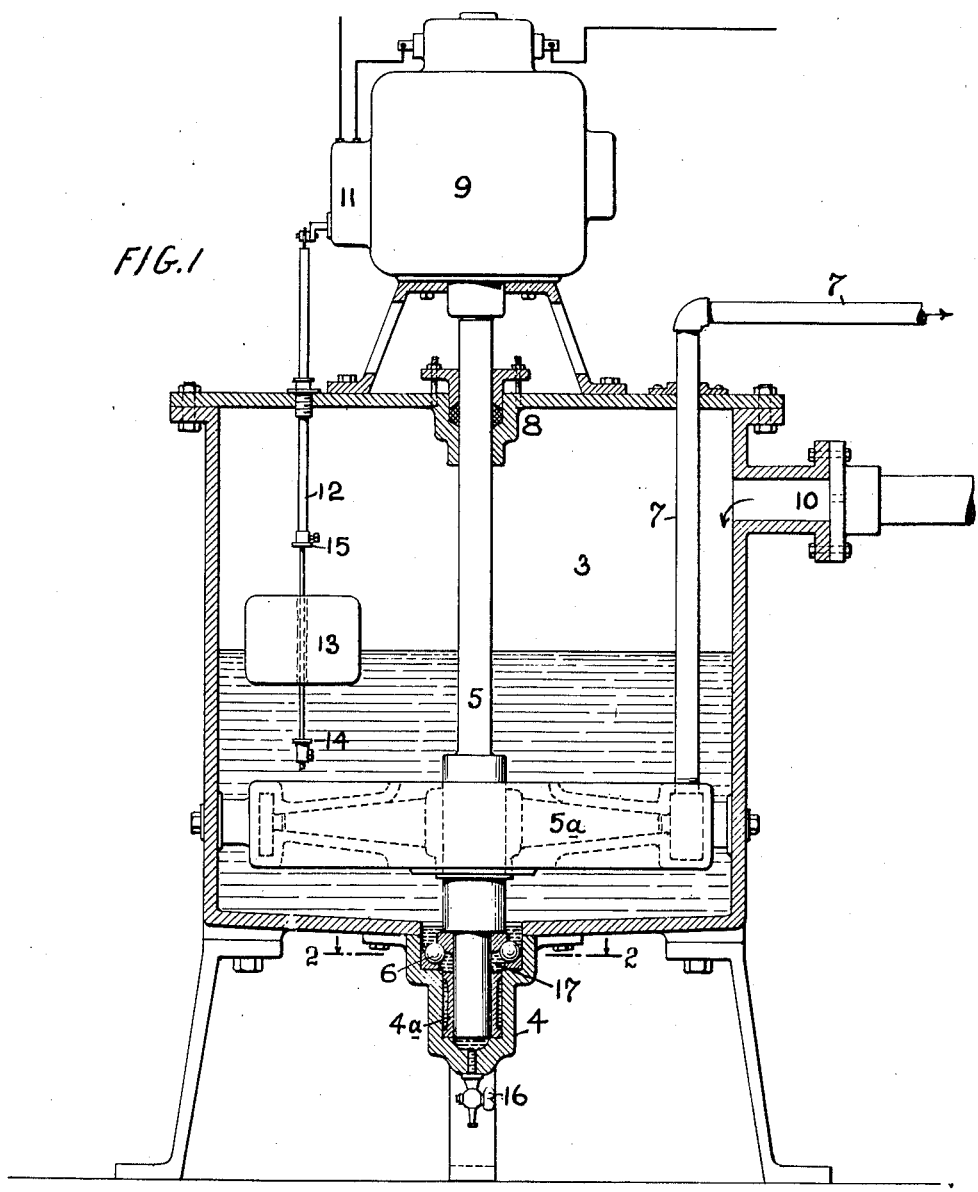
Figure 2:
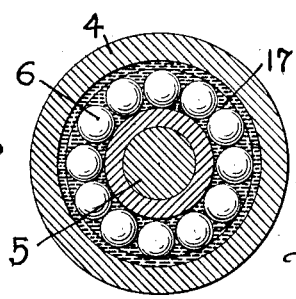

Referring to the drawings: Fig. 1 is a vertical section of a form of condensation pump provided with the improved thrust bearing, by way of example; and Fig. 2 is a cross section of the bearing, taken on line 2—2 of Fig. 1.

3 represents a suitable compartment for receiving water of condensation and is provided at the bottom with a thrust bearing socket 4. 5 is a vertical shaft, the lower end of which is stepped in the socket 4 and supported and centralized by ball bearings 6 arranged in the socket and for guiding the shaft. The shaft 5 may be provided with a rotor 5ª of any suitable construction and which, under centrifugal action, may draw the water from the compartment 3 and discharge it through a pipe 7. The upper end of the shaft 5 may extend through a stuffing box 8 and be driven by an electric motor 9. The water of condensation may be delivered to the reservoir 3 through an inlet 10. A suitable switch device 11 may be provided for stopping and starting the motor 9 and such starting means may be operated by a rod 12 provided at its lower part with a float 13 freely playing in a vertical direction between the collars 14 and 15, and the float reaches the collar 15 by accumulation of water in the compartment 3. The float operates the starter and puts the motor and rotor into action, causing the discharge of water from the compartment. When the level of the water is lowered, so that the float comes in contact with the lower collar 14, the starter is shifted to open the circuit and bring the motor to rest. So far as these details of apparatus are concerned, they are only illustrative of the requirements of a high speed rotatable vertical shaft which requires suitable thrust bearings at the bottom.

With the construction, as that described, it is manifest that the hot water of condensation in the compartment 3 will enter the thrust bearing at the bottom and completely submerge it, and permit all grit and dirt to find its way down into the bearing, and which, in the absence of a lubricant such as oil or grease, will produce objectionable abrasion, causing the bearing to rapidly wear out. Instead of permitting water to enter the said thrust bearing, as heretofore, the socket 4 is filled with mercury 17 which completely submerges all of the working parts of the thrust bearing and, because of its weight, it expels from the socket and operative parts of the bearing all water and grit so that the bearing proper is always clean and consequently requires no lubrication. As before pointed out, however, the bearing portions must be of material that will not have an affinity for the mercury, and consequently, it is desirable to employ steel or iron for the lower or bearing end of the rotatable shaft and for the socket in which it is centered, as well as the ball or roller bearings. The extreme lower end of the shaft may be centered in a bushing 4ª formed of lignum vitæ, if so desired, but ordinarily, a steel or iron bushing may be employed.

The extreme bottom of the socket portion 4 may be provided with a drain outlet 16 which may be closed by a valve or plug of any suitable construction and by which the mercury may be drained out and replaced with fresh mercury from time to time.

The essential feature of the improvement resides in the use of a heavy metal fluid at normal temperatures, completely submerging the operative metal parts of the thrust bearing and displacing all materials of a lighter nature and raising them above the level of the operative parts of the thrust bearing.

It will now be apparent that there has been devised a novel and useful construction of thrust bearing which embodies the features of advantages enumerated as desirable, and that while in the present instance is shown and described the invention as applied to an apparatus in which the improvement is useful, it is to be understood that it is not to be restricted as to the details of the thrust bearing itself as the same are susceptible of modification in various particulars and which, when employed with the mercury element, are within the spirit or scope of the invention.

Having now described the invention, what is claimed and desired to be secured by Letters Patent is:

1. The combination of a compartment adapted to hold water with a socket below the level of the water, a vertically rotatable shaft extending down through the water within the compartment and having its lower end journaled in the socket, and mercury filling the space within the socket for submerging the operative bearing portions of the socket and shaft whereby all water, grit and other matters are displaced from contact with the bearings.

2. The invention according to claim 1, wherein further, the socket portion is provided at its upper edge with an annular floor inclining downward toward the space within the socket, whereby any mercury which might be thrown out of the socket will automatically return thereto by gravity.

In testimony of which invention, Straus Trust Company, executor of FRANK H. MONTREUIL, deceased, has hereunto caused its name to be affixed by its duly authorized officer.

STRAUS TRUST COMPANY,
      By ARTHUR W. STRAUS, Treasurer,
    *Executor of Frank H. Montreuil, Deceased.*